July 26, 1938.   S. ITZIGSON   2,125,232
ANTIGLARE DEVICE
Filed Sept. 13, 1937
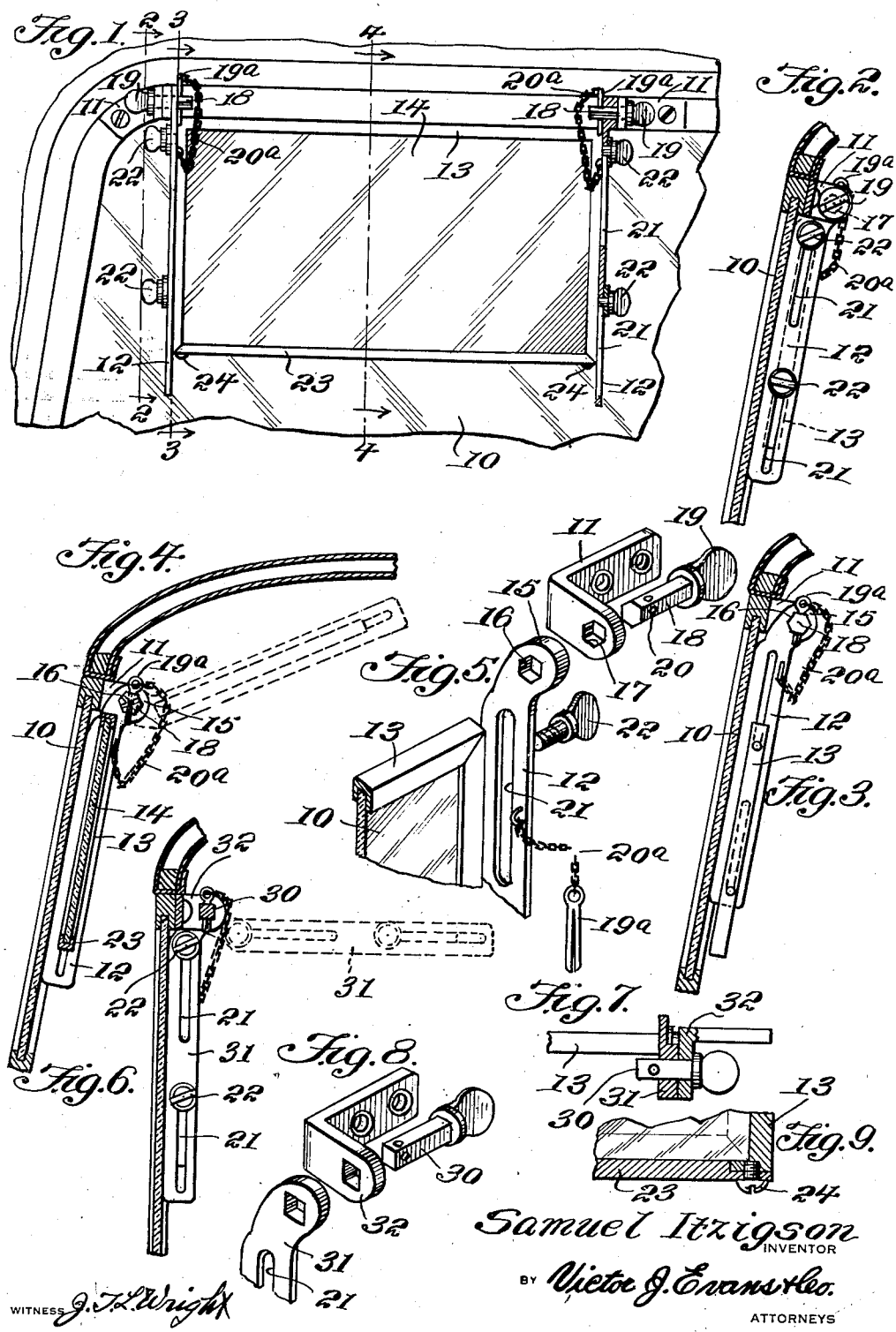
Samuel Itzigson INVENTOR
BY Victor J. Evans & Co. ATTORNEYS Patented July 26, 1938

2,125,232

UNITED STATES PATENT OFFICE 2,125,232

ANTIGLARE DEVICE

Samuel Itzigson, Brooklyn, N. Y.

Application September 13, 1937, Serial No. 163,664

1 Claim. (Cl. 296—97)

My invention relates to antiglare devices and more particularly to antiglare devices used in connection with automobile windshields.

One of the principal objects of my invention is to provide an antiglare device attachable to the windshield of an automobile and equipped with means for adjusting the frame having the antiglare material secured therein to positions below the line of vision.

Another object of my invention is to provide a device of the above described character wherein the device is capable of being adjusted to a fixed position when not in use.

Other objects and advantages will be apparent from the following description, appended claim and annexed drawing.

Referring to the drawing wherein like reference characters designate like parts throughout the several views:

Fig. 1 is a rear elevation illustrating a section of a windshield having my invention secured thereto.

Figures 2, 3 and 4 are sectional views taken on the lines 2—2, 3—3 and 4—4 of Figure 1 respectively.

Fig. 5 is a detail perspective view of one of the brackets, arms, shafts and corelated parts.

Fig. 6 is a detail sectional view illustrating a modified form of shaft.

Fig. 7 is a detail sectional view taken on a line 7—7 of Figure 6.

Fig. 8 is a detail perspective view of one of the brackets, frame members, and shafts of the modified form illustrated in Figure 6.

Fig. 9 is a detail sectional view of the frame construction.

In the preferred embodiment illustrated in Figures 1 to 5 inclusive there is illustrated a section of a windshield 10 forming part of a motor vehicle body of ordinary construction. Secured to the upper rail of the windshield is a pair of spaced brackets 11 for supporting therebetween a pair of arms 12 connected to a frame 13 having a panel of antiglare material 14 secured therein. The upper ends of the arms 12 are formed with enlarged sections 15 having hexagonal-shaped openings 16 formed therethrough registering with similar shaped openings 17 formed in the brackets 11.

Hexagonal-shaped shafts 18 having finger pieces 19 extend through said apertures and are maintained therein by means of pins 19a inserted through holes 20 formed in the shafts. The pins 19a are connected to the arms 12 by means of chains 20a to prevent loss thereof when the device is being adjusted.

The arms 12 are formed with pairs of longitudinally extending slots 21 for receiving therethrough thumb bolts 22 threaded into the side rails of the frame 13.

Obviously, by manipulation of the thumb bolts 22 the frame 13 may be lengthwise adjusted between the arms 12 to permit a person to view the line of travel of the automobile to which the windshield is attached above the upper horizontal end of the frame 13 or through the transparent material 14, as the case may be.

As illustrated in Fig. 5, the pins 19a are formed with resilient leg sections normally spaced relative to each other to prevent the pins from becoming accidentally disengaged from the shafts. The leg sections may be pressed together to permit removal from or insertion in the shafts.

When it is desired not to use the device over an extended period of time, for instance in the daytime, the shafts 18 may be removed and the arms including the frame adjusted to a position adjacent the roof of the automobile as clearly illustrated in Figure 4 of the drawing, the shafts being inserted and secured to the brackets and arms by means of the pins 19a after said adjustment has been completed.

In automobiles having vertically extending windshields, sufficient space is not obtainable to adjust the device in an upwardly and inwardly inclined plane as illustrated in dotted lines in Figure 4. Therefore, in the modified form illustrated in Figures 6 to 8 inclusive the shafts 30 are of a tetrahedral configuration for engagement within similar shaped openings formed in the arms 31 and brackets 32. This construction permits of the device to be raised and maintained in a horizontal position.

As illustrated in Figure 9 the frame 13 is provided with a lower demountable rail 23 secured to the side rails by means of a screw 24. Should it be desired to replace the panel 14, which may be constructed of glass, the lower rail 23 may be detached from the frame and the panel withdrawn therefrom, another inserted and the rail resecured to the frame.

What I claim is:

A device of the character described, comprising, in combination, a windshield, spaced brackets secured to said windshield and fashioned with angular shaped openings, depending arms having upper end sections fashioned with angular shaped openings for registry with said first mentioned openings and said arms fashioned with longitudinally extending slots, a frame having antiglare material secured therein and slidable relative to said arms, thumb bolts connecting said frame to said arms and extending through said slots whereby to permit adjustment of said frame relative to said arms in a manner to position said material in said frame below the line of vision of a person using said windshield in one position and within the line of vision in another position, detachable shafts connecting the end sections of said arms to said brackets and having angular disposed faces coacting with said first and second mentioned openings for securing said arms in selected positions whereby to maintain said frame and material above and within the line of vision respectively, pins detachably secured through said shafts for maintaining said shafts in connected relation with said arms and brackets, and chains connecting said pins to said arms for maintaining said pins in proximity to the respective arms upon withdrawal of said shafts from said brackets whereby to effect a quick adjustment of said arms relative to said brackets.

SAMUEL ITZIGSON.